F. E. SMITH.
AUTOMOBILE TORPEDO.
APPLICATION FILED OCT. 13, 1913.
1,092,759.
Patented Apr. 7, 1914.
8 SHEETS—SHEET 1.
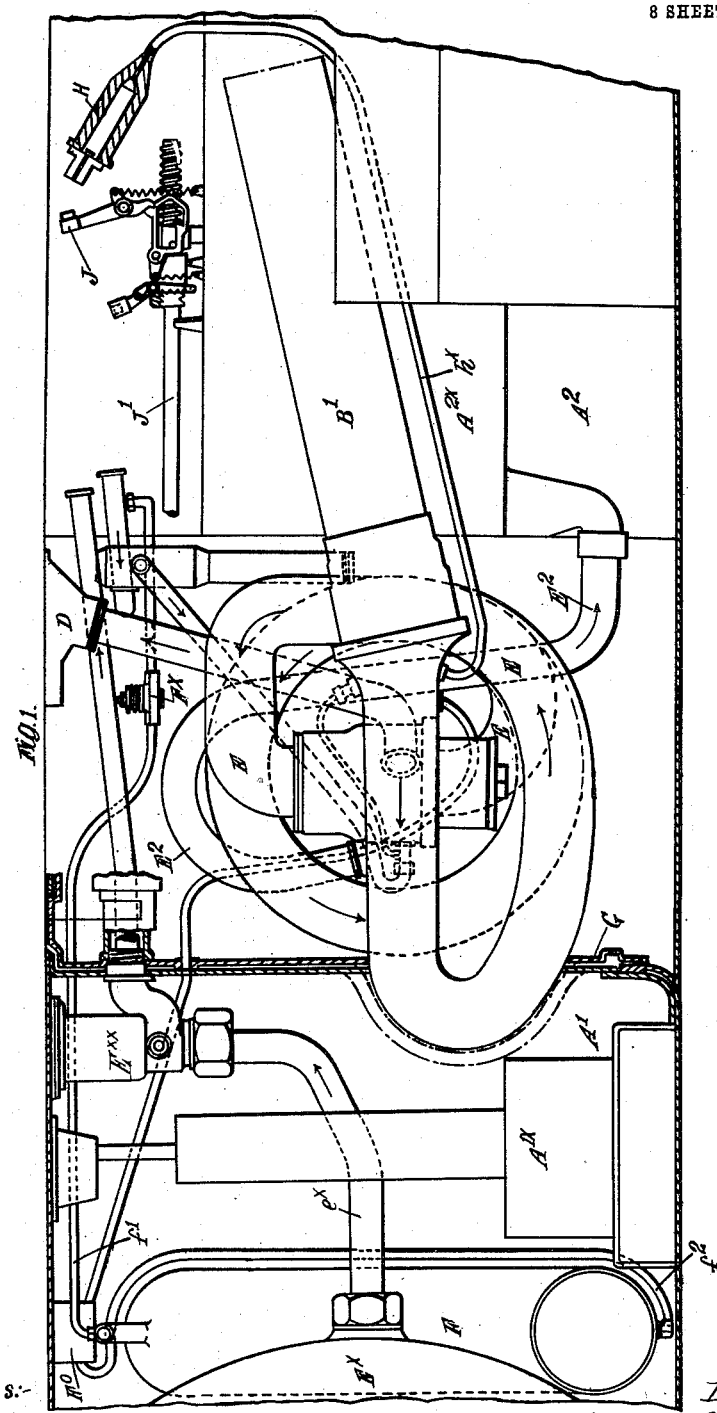

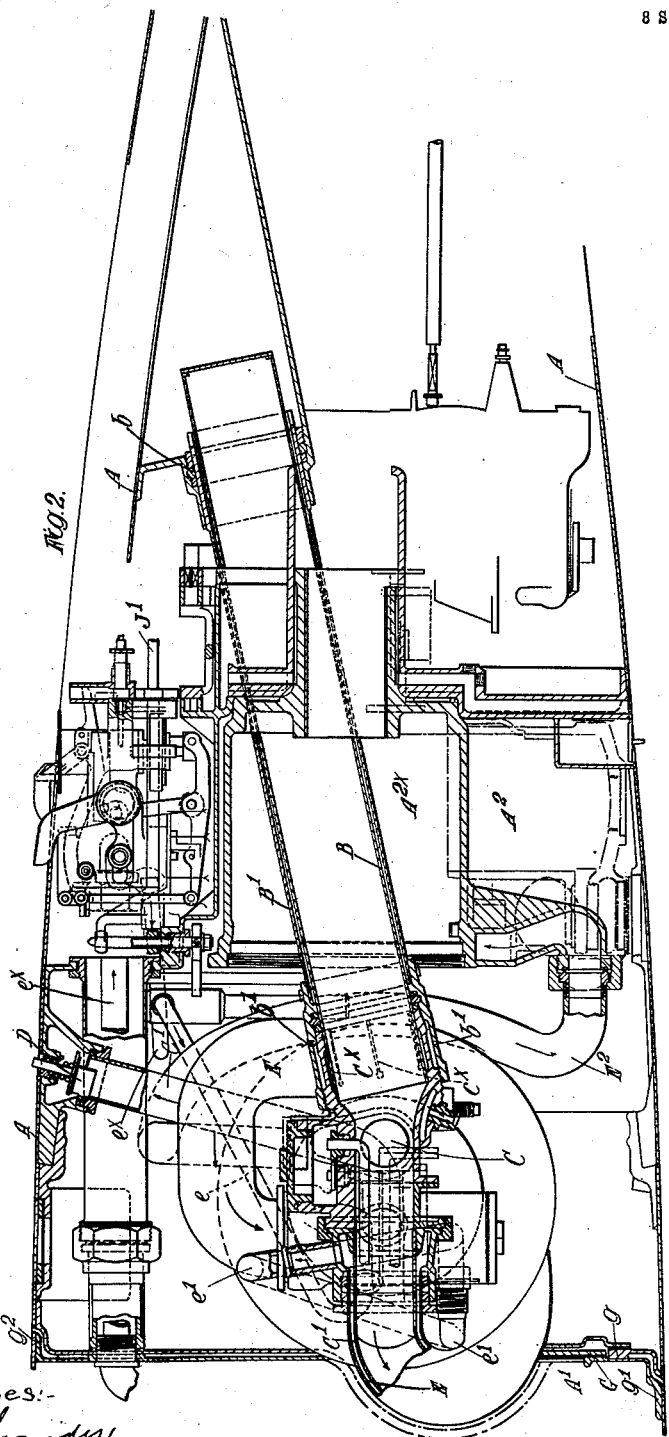

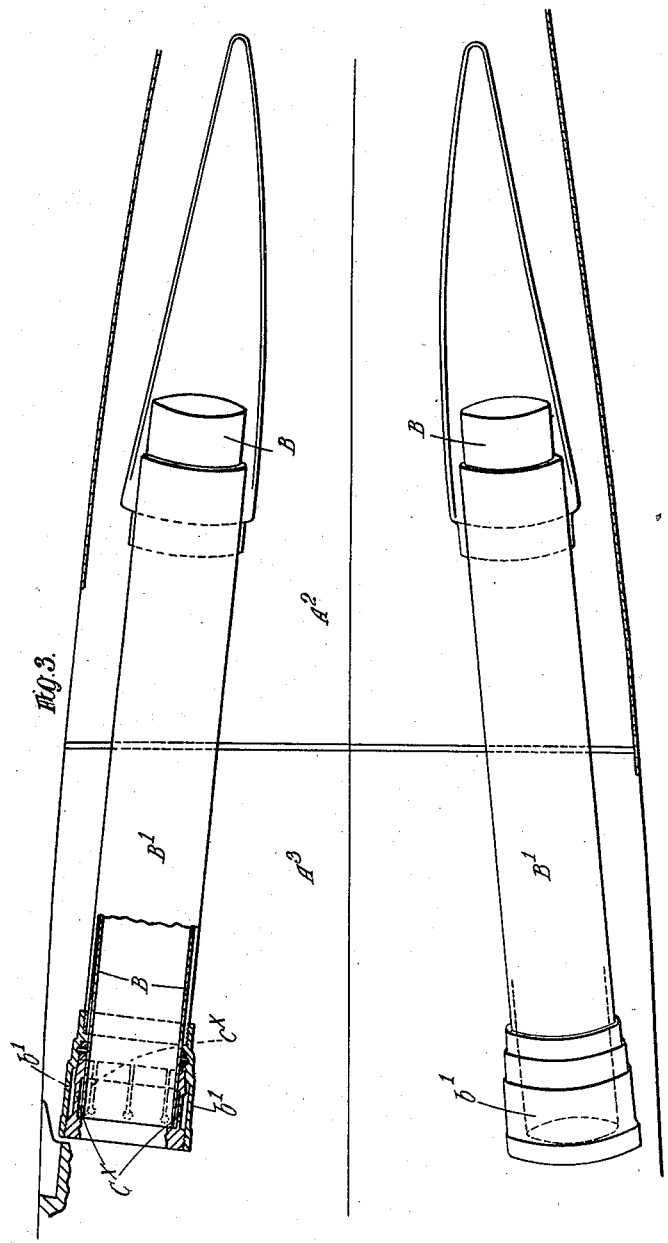

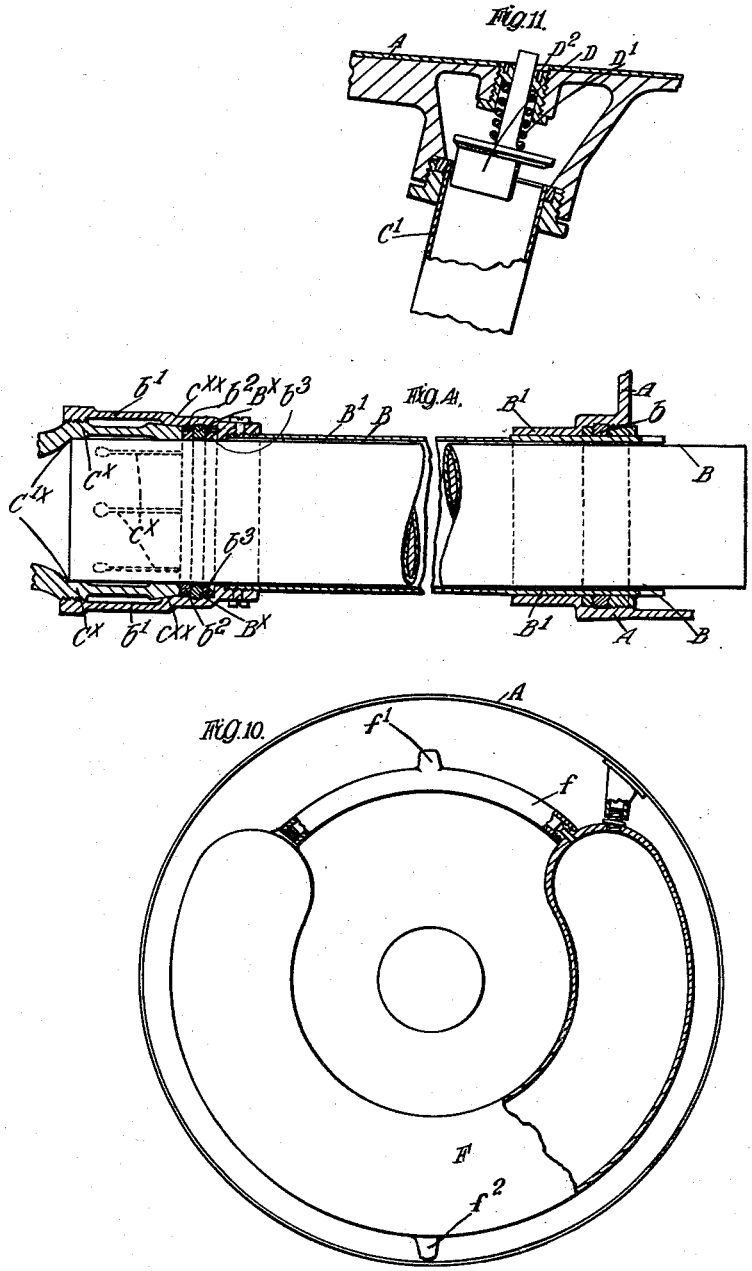

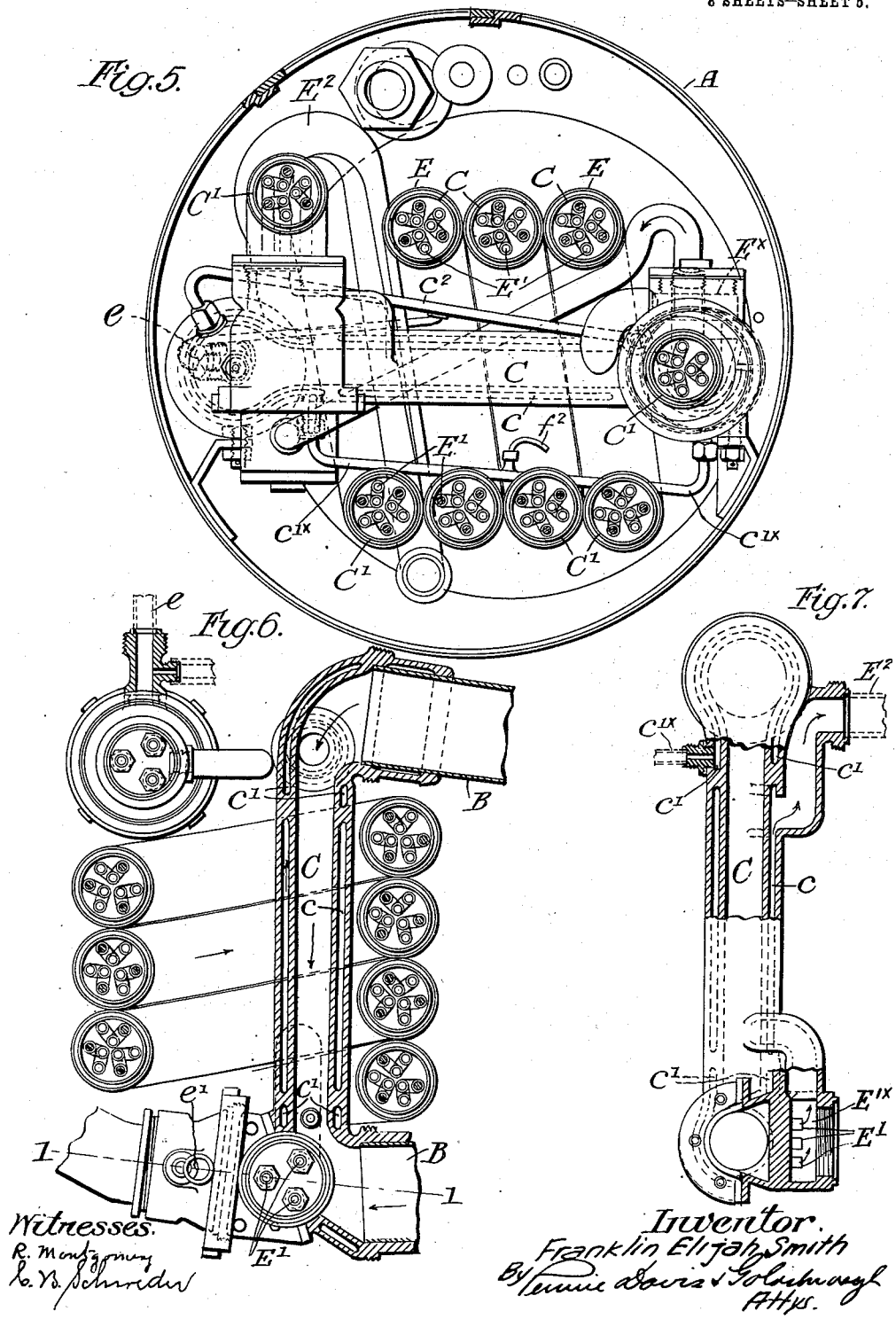
F. E. SMITH.
AUTOMOBILE TORPEDO.
APPLICATION FILED OCT. 13, 1913.
1,092,759.
Patented Apr. 7, 1914.
8 SHEETS—SHEET 5.

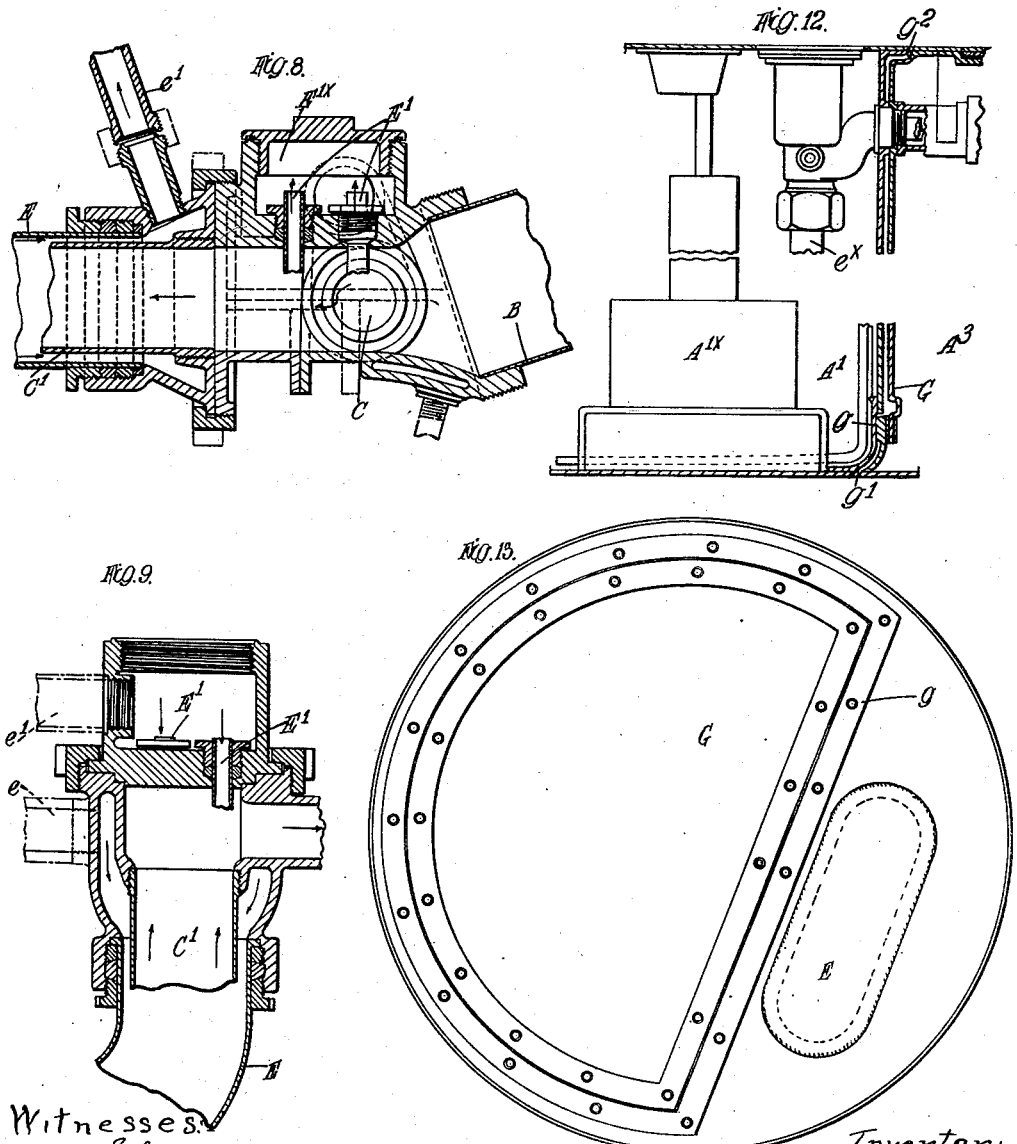

F. E. SMITH.
AUTOMOBILE TORPEDO.
APPLICATION FILED OCT. 13, 1913.
1,092,759.
Patented Apr. 7, 1914.
8 SHEETS—SHEET 7.
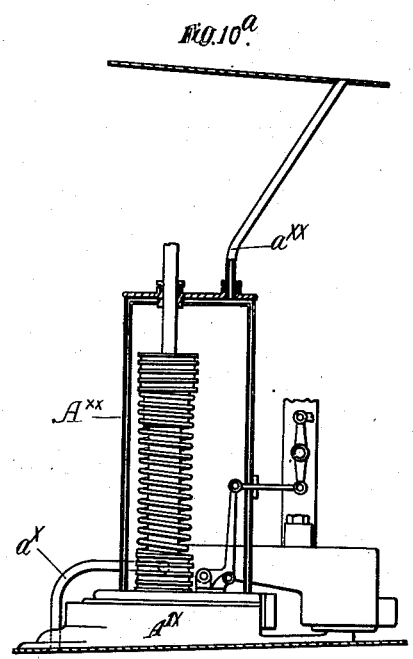
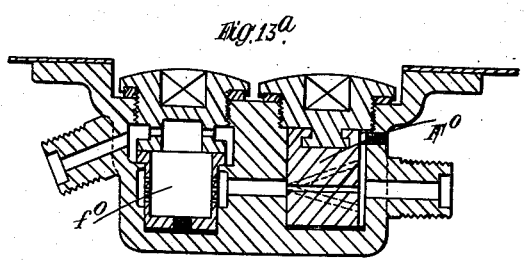

F. E. SMITH.
AUTOMOBILE TORPEDO.
APPLICATION FILED OCT. 13, 1913.
1,092,759.
Patented Apr. 7, 1914.
8 SHEETS—SHEET 8.
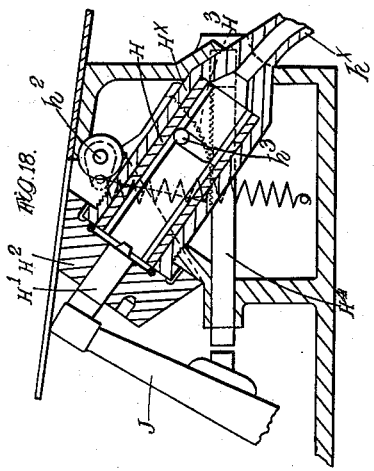
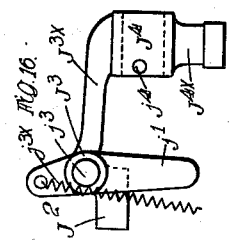
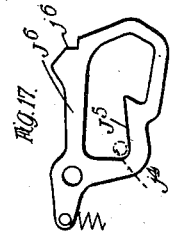
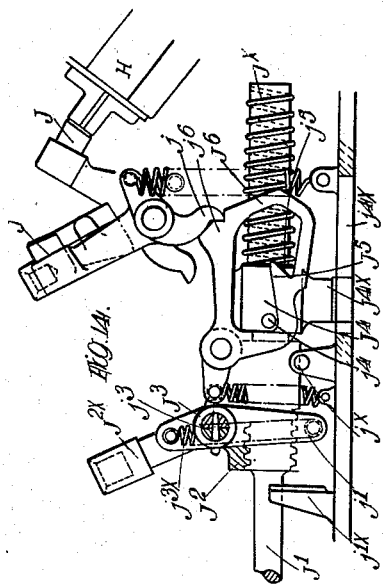
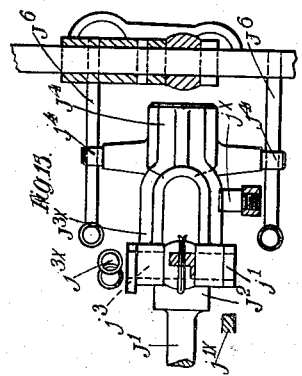
Witnesses:—
C. B. Schroeder
L. Bates
Inventor:—
Franklin Elijah Smith
by Pennie, Davis & Edelman
Attorneys

UNITED STATES PATENT OFFICE.

FRANKLIN ELIJAH SMITH, OF WEYMOUTH, ENGLAND, ASSIGNOR TO VICKERS LIMITED, OF WESTMINSTER, ENGLAND.

AUTOMOBILE TORPEDO.

1,092,759.  Specification of Letters Patent.  Patented Apr. 7, 1914.

Application filed October 13, 1913. Serial No. 794,824.

*To all whom it may concern:*

Be it known that I, FRANKLIN ELIJAH SMITH, a subject of the King of Great Britain, residing at Portland Harbour Works, Weymouth, in the county of Dorset, England, have invented certain new and useful Improvements in Automobile Torpedoes, of which the following is a specification.

This invention relates to automobile torpedoes of the kind in which improved means are provided for heating the compressed air serving as the motive fluid, prior to its delivery to the propelling engine.

The method usually employed for preheating the compressed air, consists in bringing it at a reduced pressure into direct contact with petroleum or other suitable liquid hydrocarbon which is sprayed into a common combustion space with the compressed air, where it is ignited, the oxygen necessary to maintain combustion being obtained from the said compressed air. The combustion space is in direct communication with the propelling engine, into and through which the products of combustion are carried with the heated compressed air. This method of heating possesses many disadvantages, some of which are that, owing to the velocity of the heated gases being contingent upon the pressure, the working pressure must be limited to that velocity at which the heated gases may be conveyed to, and used by the propelling engine without injury thereto, thus limiting the initial working pressure of the propelling engine; that, owing to the lubricant being in direct contact with the products of combustion, whether they be in the form of flame or otherwise, lubrication difficulties arise, with the result that there is risk of injury to the propelling engine and other working parts due to lack of efficient lubrication; that the difficulties encountered in obtaining a constant and uniform flow of the petroleum or other liquid hydrocarbon in transit to the combustion space, prevent uniformity in the heat generated therefrom, thus causing the motive fluid admitted to the propelling engine to vary both as regards pressure and temperature; that, owing to its being impracticable to regulate the heat it is necessary, in order to prevent injury to the propelling engine and other working parts of the heating system, due to excessive heat, to have them placed in connection with circulating sea water, thus rendering it impracticable to obtain the greatest possible thermal efficiency desired from the preheating; that, because of the necessarily small dimensions of the spraying nozzle through which the petroleum or other liquid hydrocarbon is supplied, considerable risk arises of the whole heating system being rendered inoperative owing to the minute orifices of the spraying nozzle becoming choked and preventing the passage of the liquid hydrocarbon.

According to this invention, the heat necessary for preheating the compressed air is generated by the combustion of a slow-burning heat-generating substance which is preferably used in the form of a solid and instead of its being burned in direct contact with the compressed air, the latter is caused in its passage to the propelling engine to travel through a heated channel or conduit which derives its heat from the flame and the products of combustion resulting from the ignition of the said slow burning substance, the wall of the said channel or conduit separating the flame and products of combustion from the compressed air. The flame and products of combustion are preferably caused to pass in the opposite direction to that of the compressed air, so that the maximum amount of transference of heat will be obtained. The said channel or conduit may be in the form of a helically wound tube, within which an inner tube is arranged, the former preferably receiving the compressed air (after it has passed the reducing valve) and the latter the flame and products of combustion. In addition the compressed air may be caused to pass through small pipes disposed within the said inner tube.

One or more cylindrical casings or carriers are provided for the purpose of holding thin cylindrical metal casings or shells into which the slow-burning heat-generating substance is compressed solid. Each of the said cylindrical casings or carriers is so constructed and arranged that it is able to move lengthwise in expanding under the influence of the heat generated by the burning substance. The said casings or carriers are also so arranged that the metallic casings or shells containing the heat generating substance may be inserted from the exterior of the torpedo. When more than one cylindrical casing or carrier is used they communicate with each other by a conduit which is preferably arranged transversely of the torpedo and is provided at one end with an outlet for the flame and the products of combustion of the said substance. This outlet is connected to one end of the inner helically wound tube, the other end of which communicates with an exhaust opening controlled by a valve. Liquid may be supplied to a cavity in the aforesaid transverse conduit for conversion into steam or vapor, and is preferably carried in a U-shaped flask, which is arranged in any suitable position in a plane transverse to the axis of the torpedo. A space is left at the upper part of the two arms of this flask above the level of the liquid, each space being in communication with the air under pressure. By these means the liquid will always be subject to the pressure of the compressed air and be expelled from the flask irrespective of the heeling or other movements of the torpedo. The said exhaust valve is automatic in its action and preferably of the lift type controlled by an adjustable spring by the setting of which the pressure of the combustion gases in the heating system can be varied. In this manner the speed at which the combustion of the substance takes place can be adjusted as required prior to the run of the torpedo. The adjusting means for the spring are arranged in a readily accessible position on the exterior of the torpedo.

In order to prevent any heat which may be radiated from the heating system from penetrating the balance chamber, and thereby detrimentally affecting the working of the hydrostatic valve contained therein, a hollow partition is provided between the aforesaid watertight compartment and the balance chamber, this hollow partition being kept cool by the passage of sea water through it during the travel of the torpedo through the water. For this purpose the said partition may be open at its lower and upper parts to the sea water. Instead of employing the above mentioned water cooled partition, the hydrostatic valve, together with the other mechanism in the balance chamber may be inclosed in a hollow casing through which cooling water is caused to pass.

The aforesaid heat generating substance may be ignited by means of a cartridge carried by a casing which is contained in a chamber arranged in a position such that the cartridge can be readily inserted from the exterior of the torpedo, the flash from this cartridge being conducted to the forward end of the heat generating substance by means of a tube. The firing mechanism for the cartridge comprises a spring controlled striker or hammer which is under the influence of devices controlled or driven by the main shaft or some other rotary part of the engine in such a manner that after the engine has made a predetermined number of revolutions, the striker or hammer will be liberated and fire the cartridge. The said mechanism is so arranged in relation to the striker or hammer that the cocking of the latter causes or permits the aforesaid devices to resume their proper position for being actuated by the main shaft or other rotary part of the engine.

In order that the said invention may be clearly understood and readily carried into effect the same will be described more fully with reference to the accompanying drawings in which:—

Figure 1 is a purely diagrammatic elevation showing approximately the relative positions of the various portions of the invention in the torpedo. Fig. 2 is a longitudinal section of the central portion of the torpedo showing the improved air heating apparatus. Fig. 3 is a plan of the cylindrical casings or carriers containing the slow burning heat generating substance. Fig. 4 is an enlarged view of one of the aforesaid cylindrical casings or carriers. Fig. 5 is a transverse section through the torpedo showing the air heating apparatus in sectional elevation. Fig. 6 is a sectional plan showing the aforesaid transverse conduit with which the cylindrical casings or carriers communicate. Fig. 7 is a sectional elevation of the transverse conduit viewed from the left in Fig. 6. Fig. 8 is a section taken approximately on the line 1—1 of Fig. 6. Fig. 9 is a vertical section showing the portion of the apparatus at which the compressed air is admitted. Fig. 10 is an elevation of the aforesaid U-shaped flask. Fig. 10$^a$ is a sectional elevation showing diagrammatically the aforesaid hollow casing containing the hydrostatic valve. Fig. 11 is a sectional elevation of the exhaust valve. Fig. 12 is a section showing the aforesaid watertight compartment. Fig. 13 is a side elevation of Fig. 12. Fig. 13$^a$ is a sectional view of a detail hereinafter referred to. Figs. 14 to 18 are views of the firing mechanism hereinafter more fully described.

Like letters of reference indicate similar parts in all the figures.

A is the shell of the torpedo, A' is the balance chamber containing the hydrostatic valve A'$^x$, A$^2$ is the chamber containing the propelling engine A$^{2x}$ and the air heating apparatus.

B, B represent the thin metallic shells containing the slow-burning heat-generating substance, and B', B' are the cylindrical casings or carriers for the said shells. C represents the transverse conduit communicating with the said casings or carriers, and C' represents the inner helically wound tube in communication with the said transverse conduit.

D is the exhaust valve arranged in the exhaust end of the tube C'.

E is the air tube surrounding the tube C' and E', E' are the small air pipes disposed within the tube C'.

F represents the aforesaid U-shaped liquid flask and G represents the hollow partition between the chambers A' and A².

H represents the casing containing the cartridge for igniting the slow-burning heat-generating substance, H$^x$ the chamber containing the said casing, and J the striker or hammer for firing the cartridge.

The compressed air coming from its container E$^x$, after passing through the pipe $e^x$ to the reducing valve E$^{xx}$ is conducted by the pipe $e$ to the outer helically wound tube E. Upon reaching the end of this tube the air is conducted by the pipe $e'$ (Figs. 6, 8 and 9) to the aforesaid small pipes E' the entrance to which is situated contiguous to the end of the outer tube E at which the air was first admitted (Fig. 9). These small pipes are preferably as shown arranged in a group of three, and each of them may be twice bent back upon itself so that the air will be caused to pass along the full length of the inner tube three times, twice in the opposite direction to that of the flame and products of combustion in the tube C' and once in the same direction. The exit from these small pipes E' is situated contiguous to the end of the inner tube C' at which the flame is admitted (see Figs. 7 and 8), the ends of the pipes entering a chamber E'$^x$. The air passing from this chamber is conducted through annular passages $c$ (Figs. 5, 6 and 7) formed in the aforesaid transverse conduit C to an outlet pipe E² which leads to the engine. This transverse conduit may be provided with other annular passages $c'$ adapted to receive liquid from the flask F. This liquid, such as water, on admission to the passages $c'$ by the pipe $c'^x$ (Figs. 5 and 7) is immediately converted into steam by the heat generated within the conduit by the flame. This steam is led by a pipe $c^2$ to the air inlet pipe $e$ and in traversing the whole heating system with the compressed air, becomes highly super-heated, and efficiently absorbs and conveys to the propelling engine any heat which might otherwise be lost through radiation. Instead of water I may employ any other suitable liquid, or a gas, such as oxygen for example.

Each of the cylindrical casings or carriers B' comprises a tube which lies at an inclination projects rearwardly to the upper surface of the torpedo as shown in Figs. 2 and 3, each tube being slidably mounted in a gland $b$ carried by the shell of the torpedo so as to be capable of moving longitudinally under expansion and contraction due to the heat. The forward end of the tube (see particularly Fig. 4) is attached to a sleeve $b'$ which is screw threaded internally to engage with corresponding screw threads on a boss C$^x$ attached to or made integral with the aforesaid transverse conduit C. This boss is formed with longitudinal slits $c^x$ and with a slightly conical outer surface $c^{xx}$ with which a corresponding surface on the sleeve $b'$ engages, the said slits rendering the boss resilient so that it will be capable of tightly gripping the inner end of the metallic shell B which contains the heat generating substance, when the latter is inserted in place and the sleeve is rotated. The said casing or shell containing the heat generating substance is inserted into the tube from the exterior of the torpedo until its forward end bears against a shoulder C'$^x$ in the boss C$^x$. In order to prevent any water which may enter the gap between the metallic shell B and the tube B', from reaching the surface of the heat generating substance, or from entering the interior of the heating system, a ring B$^x$ of rubber or other suitable material is placed between two metallic rings $b^2$, $b^3$ one bearing against the face of the sleeve $b'$ and the other bearing against the face of the boss C$^x$ so that the relative axial movement that takes place when the sleeve $b'$ is rotated, will cause the metallic rings $b^2$, $b^3$ to close against the rubber ring B$^x$ thereby compelling the latter to bear firmly against the shell B containing the heat generating substance and forming a tight joint therewith; thus the rotation of the tube B' performs the dual function of clamping the shell B and making a watertight joint. It will be seen that by reason of the forward end of the shell B containing the heat generating substance being clamped as described, and the rear end being free within the tube B the shell is able to expand or contract lengthwise under the influence of the heat generated.

The exhaust valve D (see particularly Fig. 11) is under the influence of a helical spring D' which at its upper end bears upon a screw threaded plug D² carried by the shell A of the torpedo. By rotating the plug D² the degree of compression of the spring D' can be so regulated that the pressure of the combustion gases from the heat generating substance, and consequently the rate of combustion, can be adjusted prior to the run of the torpedo.

F is the U-shaped flask of which the two arms communicate with one another by a pipe $f$ Fig. 10 receiving compressed air through a pipe $f'$. A pipe $f^2$ enters the lower part of the flask and communicates with the water pipe $c'^x$ shown in Fig. 5. The heat generated from the combustion of the slow burning composition is such that it may produce steam in the heating system of such pressure as to be under certain conditions in excess of the pressure of the air in the heating system and in the engine; it is therefore necessary to incorporate a reducing valve $F^x$ (Fig. 1) between the high pressure lead and the water flask F which will supply air on the surface of liquid contained in the latter, from the main air supply pipe at some predetermined pressure which will always be greater than that of any steam generated in the heating system, thus insuring a constant and sufficiently high ejecting pressure under all conditions upon the liquid.

The amounts of liquid to be used for runs of various lengths may be determined and regulated by a valve $F^c$ (Figs. 1 and 13$^a$) located at some convenient position in the pipe $f^2$ leading from the water flask to the heating system. This valve may take the form of a plug having a number of holes of different diameter, one or other of these holes being brought into the operative position by suitably adjusting the plug prior to the run of the torpedo. The valve casing may be provided with a straining device $f^o$ through which the water passes prior to its passage.

The whole of the aforesaid apparatus for the pre-heating of the air may be arranged, together with the engine, in a watertight compartment, this being possible because the heat generated is under absolute control. No danger of injury to any of the working parts due to excessive heat is likely to occur owing to the elimination of the causes of loss of thermal efficiency which are met with when the engine and other working parts of the heating system are surrounded by circulating sea water as heretofore; further, as the flame and products of combustion do not come into direct contact with the compressed air the lubricant may intermingle therewith and be used effectively without any change of viscosity due to burning.

The partition G that divides the chambers $A'$ and $A^2$ is as shown by Figs. 12 and 13 formed by two doors which are attached in a watertight manner to annular brackets or rings $g$ on the inner surface of the torpedo shell, leaving a space between the doors for the circulation of the sea water. These brackets or rings are cupped for the reception of a part of the helical tube E, as is clearly shown in Figs. 1 and 2. The lower opening $g'$ is directed toward the forward end of the torpedo and the upper opening $g^2$ toward the rear of the torpedo. By these means the water is scooped up by the lower opening and forced through the partition and out of the upper opening, thus insuring a constant flow of sea water through the space.

Fig. 10$^a$ shows the arrangement in which the hydrostatic valve is surrounded by a hollow casing $A^{xx}$ through which sea water passes, this casing being provided at or near its lower end with a forwardly extending pipe $a^x$ in communication with the sea and at or near its upper end with a rearwardly extending pipe $a^{xx}$ also in communication with the sea.

The striker or hammer J of the firing mechanism is arranged contiguous to the shell of the torpedo to enable ready access to be had thereto for setting the striker or hammer into its retracted or cocked position from the exterior of the torpedo. The devices shown in Figs. 14 to 17 for liberating the striker or hammer J comprises a shaft $J'$ driven from the engine and formed with screw threads or worm teeth which engage with a segmental nut $J^2$ carried by a two-armed lever $J^3$ which is pivoted at $j^3$ in such a position that the nut $J^2$ can be moved out of engagement with the screw threads or worm teeth. This two-armed lever $J^3$ is under the control of a spring $j^{3x}$ which is so arranged in relation to the pivotal axis $j^3$ of the said lever that the latter will be retained by the spring $j^{3x}$ in either of its two displaced positions, i. e. with the nut $J^2$ in engagement or out of engagement with the screw threads or worm teeth on the shaft $J'$. This lever $J^3$ is carried by forks $J^{3x}$ forming part of a sleeve $J^4$ (Fig. 16) having pins or projections $j^4$. These pins or projections are adapted to coöperate with cams $J^5$ (Fig. 17) on a pivoted spring controlled member $J^6$ which has a projection $j^6$ that engages with a toe-piece $j$ on the striker or hammer. The sleeve $j^4$ has a downward projection $J^{4x}$ that engages in a longitudinal guide slot $j^{4x}$. This arrangement is such that as the segmental nut $J^2$ is displaced along its shaft $J'$ by the rotation of the latter carrying with it the lever $J^3$ and the sleeve $J^4$, the pins $j^4$ on the sleeve $J^4$ coöperate with the cams $J^5$ to rock the member $J^6$ about its pivot and to eventually disengage the projection $j^6$ from the toe-piece $j$ of the hammer. When this release takes place the pins $j^4$ lie opposite or beyond shoulders $j^5$ on the cams $J^5$, so that the spring of the member $J^6$ causes the latter to assume a position such that the shoulders $j^5$ are in line with the pins $j^4$. The aforesaid sleeve $J^4$ carrying the lever $J^3$ and the pins $j^4$, is controlled by a helical spring $J^x$ which serves to move the sleeve axially so that the pins $j^4$ engage with the shoulders $j^5$ of the cams, the segmental nut $J^2$ having previously been moved out of engagement with the screw threads or worm teeth on the shaft $J'$, by one arm $j'$ of the two-armed lever coöperating with a fixed stop $j^x$; the nut $J^2$ is retained in this position by the spring $j^{3x}$ of the said lever as aforesaid.

In cocking or re-setting the striker or hammer J, the coöperation of the toe-piece *j* thereon with the projection $j^6$ on the spring controlled member $J^6$, causes the latter to be moved into a position such that the shoulders $j^5$ of the cams $J^5$ move out of engagement with the pins $j^4$ on the sleeve $J^4$. The spring $J^x$ of the sleeve then returns the latter, together with the nut $J^2$ and its two-armed lever $J^3$, to their original position. During the final portion of this movement the arm $j'$ of the said lever coöperates with a fixed part $j'^x$ to cause the nut $J^2$ to engage with the screw threads or worm teeth of the shaft $J'$ the spring $j^{3x}$ of the lever retaining the nut in this position as aforesaid. Means are provided whereby the said lever $J^3$ and the nut $J^2$ can be moved into the position in which the nut is rendered inoperative, this movement taking place without interfering with the other parts of the devices. For this purpose the lever $J^2$ is formed with a suitable part $J^{2x}$ to receive a key or other instrument which can be inserted through the torpedo shell. By these means the firing mechanism can be set into the inoperative position thus enabling the engine to be run without the ignition of the heat generating substance taking place.

Two strikers or hammers J and two cartridges are preferably employed, each of the strikers being under the control of one of the cams $J^5$; this arrangement insures that even if one of the cartridges misses fire the heat generating substance will still be fired.

The firing needle $H'$ for the cartridge (Fig. 18) is carried in a cap $H^2$ which is pivoted at $h^2$ and so arranged that it can be turned into a position to expose the cartridge chamber, so that a fresh cartridge can be inserted from the exterior of the torpedo. This movement of the cap $H^2$ automatically lifts the carrier H together with the spent cartridge, into an exposed position exterior to the shell of the torpedo. For this purpose the said cap $H^2$ is connected to, or made integral with a toothed segment $H^3$. This toothed segment has a pin $h^3$ which projects through a slot in the cartridge carrier H, and engages with the latter so that the action of moving the cap $H^2$ causes the pin to lift the carrier H forward beyond the shell of the torpedo thus exposing the spent cartridge; also, the toothed segment engages with teeth formed on a push rod $H^4$ which is so disposed that the movement of the push rod, resulting from the opening of the cap or casing, causes the said rod to cock the hammer or striker J. The chamber $H^x$ containing the carrier H communicates by means of a pipe $h^x$ with one or both of the casings $B'$ at or near the portions contiguous to the forward ends of the shells B containing the slow burning heat generating substance. When two cartridges are employed as aforesaid, two chambers $H^x$ are employed each of them preferably communicating by pipes to the same casing $B'$.

What I claim as my invention and desire to secure by Letters Patent of the United States is:—

1. In an automobile torpedo, the combination with the compressed air container and the propelling engine driven by said compressed air, of a carirer for a slow-burning heat-generating substance, and an air conduit interposed between the container and the engine and heated by the flame and the products of combustion resulting from the ignition of the said substance, the wall of which conduit divides the air from the flame and products of combustion.

2. In an automobile torpedo, the combination with the compressed air container and the propelling engine driven by said compressed air, of a carrier for a slow-burning heat-generating substance, and an air conduit interposed between the container and the engine and heated by the flame and the products of combustion resulting from the ignition of the said substance which pass over the wall of the said conduit in a contrary direction to the flow of the compressed air, the wall of the said conduit dividing the air from the flame and products of combustion.

3. In an automobile torpedo, the combination with the compressed air container and the propelling engine driven by said compressed air, of a carrier for a slow-burning heat-generating substance, an air conduit interposed between the container and the engine, and a conduit arranged within said air conduit for the passage of the flame and products of combustion resulting from the ignition of the said substance.

4. In an automobile torpedo, the combination with the compressed air container and the propelling engine driven by said compressed air, of a carrier for a slow-burning heat-generating substance, an air conduit interposed between the container and the engine, and a conduit arranged within said air conduit for the passage of the flame and products of combustion resulting from the ignition of the said substance, said flame and products of combustion passing through its conduit in an opposite direction to that in which the air passes through its conduit.

5. In an automobile torpedo, the combination with the compressed air container and the propelling engine driven by said compressed air, of a carrier for a slow-burning heat-generating substance, an air conduit interposed between the container and the engine, a conduit arranged within said air conduit for the passage of the flame and products of combustion resulting from the ignition of the said substance, and another conduit arranged within the inner conduit for the passage of the air after it has left the outer conduit.

6. In an automobile torpedo, the combination with the compressed air container and the propelling engine driven by said compressed air, of a carrier for a slow-burning heat-generating substance, an air conduit interposed between the container and the engine, a conduit arranged within said air conduit for the passage of the flame and products of combustion resulting from the ignition of the said substance, and a number of small pipes arranged within the inner conduit and through which the air passes after leaving the outer conduit.

7. In an automobile torpedo, the combination with the compressed air container and the propelling engine driven by said compressed air, of a carrier for a slow-burning heat-generating substance, a helically wound tube in communication with said carrier and a second helically wound tube disposed around the first mentioned tube and through which the compressed air is caused to pass prior to its admission to the engine.

8. In an automobile torpedo, the combination with the compressed air container and the propelling engine driven by said compressed air, of a carrier for a slow-burning heat-generating substance, a helically wound tube in communication with said carrier and a second helically wound tube disposed around the first mentioned tube and through which compressed air prior to its admission to the engine is caused to pass in a direction opposite to that in which the flame and products of combustion move in the first mentioned tube.

9. In an automobile torpedo, the combination with the compressed air container and the propelling engine driven by said compressed air, of a carrier for a slow-burning heat-generating substance, a helically wound tube in communication with said carrier, a second helically wound tube disposed around the first mentioned tube and through which the compressed air is caused to pass prior to its admission to the engine, and small helically wound pipes that are disposed within the inner tube.

10. In an automobile torpedo, the combination with the compressed air container and the propelling engine driven by said compresssed air, of a carrier for a slow-burning heat-generating substance, a helically wound tube in communication with said carrier, a second helically wound tube disposed around the first mentioned tube and through which compressed air prior to its admission to the engine is caused to pass in a direction opposite to that in which the flame and products of combustion move in the first mentioned tube, and small helically wound pipes that are disposed within the inner tube.

11. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, a carrier for said substance, and means whereby said carrier is permitted to move longitudinally during expansion and contraction.

12. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, a metal shell containing the said substance in solid form, a carrier into which the said shell is inserted from the exterior of the torpedo, and means for permitting said carrier to move longitudinally during expansion and contraction.

13. In an automobile torpedo, the combination with the compressesd air container and the propelling engine driven by said compressed air, of an air heating apparatus comprising an air conduit and another conduit for the passage of the flame and products of combustion resulting from the ignition of a slow-burning heat-generating substance, a metal shell containing the said substance in solid form, a carrier into which the said shell is inserted from the exterior of the torpedo, means for permitting said carrier to move longitudinally during expansion and contraction, means for holding the shell in position and means between said shell and carrier for preventing the entry of water.

14. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, two carriers for said substance and a conduit connecting said carriers and the conduit through which the flame and products of combustion from the said substance pass.

15. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, two carriers for said substances and a transverse conduit connecting said carriers and the conduit through which the flame and products of combustion from the said substance pass.

16. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, an exhaust valve in the last mentioned conduit, a spring for said valve, and means for adjusting the said spring.

17. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, two carriers for said substance, a conduit connecting said carriers and the conduit through which the flame and products of combustion from the said substance pass, means for admitting liquid to a passage around the conduit connecting said carriers, and means for mixing the vapor resulting from said liquid with the compressed air prior to its admission into its conduit.

18. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, two carriers for said substance, a transverse conduit connecting said carriers and the conduit through which the flame and products of combustion from the said substance pass, means for admitting liquid to a passage around the said transverse conduit and means for mixing the vapor resulting from said liquid with the compressed air prior to its admission into its conduit.

19. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, two carriers for said substance, a conduit connecting said carriers and the conduit through which the flame and products of combustion of the said substance pass, means for admitting gas to a passage around the conduit connecting said carrier and means for mixing said gas, after it has become heated, with the compressed air prior to its admission to its conduit.

20. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, two carriers for said substance, a transverse conduit connecting said carriers and the conduit through which the flame and products of combustion of the said substance pass, means for admitting gas to a passage around the transverse conduit, and means for mixing said gas, after it has become heated, with the compressed air prior to its admission to its conduit.

21. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, two carriers for said substance, a conduit connecting said carriers and the conduit through which the flame and products of combustion of the said substance pass, a U-shaped flask arranged in a plane transverse to the axis of the torpedo, means for admitting liquid from said flask to a passage around the conduit connecting said carriers, and means for mixing the vapor resulting from said liquid with the compressed air prior to its admission to its conduit.

22. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, two carriers for said substance, a transverse conduit connecting said carriers and the conduit through which the flame and products of combustion of the said substance pass, a U-shaped flask arranged in a plane transverse to the axis of the torpedo, means for admitting liquid from said flask to a passage around the conduit connecting said carriers, means for mixing the vapor resulting from said liquid with the compressed air prior to its admission to its conduit, and means for admitting compressed air to the two arms of the said U-shaped flask.

23. In an automobile torpedo, the combination with the compressed air container and the propelling engine driven by said compressed air, of an air heating apparatus comprising an air conduit and another conduit for the passage of the flame and products of combustion resulting from the ignition of a slow-burning heat-generating substance, a carrier for said substance, a chamber arranged contiguous to the shell of the torpedo and containing a cartridge, means for igniting said cartridge and a tube for transmitting the flash from the cartridge of the forward part of said substance.

24. In an automobile torpedo the combination with the compressed air container and the propelling engine driven by the compressed air, of igniting means for the heat generating substance that heats the air prior to its admission to the engine, comprising a spring controlled striker, and devices driven by said engine for releasing said striker after the engine has made a predetermined number of revolutions.

25. In an automobile torpedo, the combination with the compressed air container and the propelling engine driven by the compressed air, of igniting means for the heat generating substance that heats the air prior to its admission to the engine, said means comprising a carrier for a cartridge, a spring controlled striker, a screw threaded shaft, means for operating said shaft from a moving part of said engine, a segmental nut engaging said shaft, a spring controlled lever carrying said nut, a displaceable sleeve, means for pivotally mounting said lever on the sleeve, a projection on said sleeve, a pivoted cam member coöperating with said projection, a projection on said cam member and a toe-piece on the striker coöperating with said projection.

26. In an automobile torpedo, the combination with the compressed air container, the propelling engine driven by the compressed air and means for heating said air prior to its admission to the engine, of a cartridge for igniting the heat generating substance for heating the air, a carrier for said cartridge, a chamber for said carrier, a movable cap for said chamber, a firing needle carried by said cap, a striker for said needle, means for moving said cap to uncover the chamber, and means whereby said movement lifts the carrier into an exposed position on the shell of the torpedo.

27. In an automobile torpedo, the combination with the compressed air container and the propelling engine driven by said compressed air, of an air heating apparatus, a flask containing liquid, a conduit leading from said flask to the air heating apparatus, a reducing valve, a conduit leading from said container to one side of the reducing valve and another conduit in communication with the said flask and leading from the low pressure side of the reducing valve, said reducing valve being set so that the pressure of the air leaving it is in excess of the pressure of the steam generated from the liquid in the heating apparatus.

28. In an automobile torpedo, the combination with the compressed air container, and the propelling engine driven by said compressed air, of air heating apparatus, a flask containing liquid, a conduit connecting said flask to the said apparatus, means for forcing said liquid from the flask to the air heating apparatus, and a movable plug having a number of holes of different diameter placed in said conduit.

29. In an automobile torpedo, the combination with the compressed air container, and the propelling engine driven by said compressed air, of air heating apparatus, a flask containing liquid, a conduit connecting said flask to the said apparatus, means for forcing said liquid from the flask to the air heating apparatus, a strainer in said conduit, and a movable plug having a number of holes of different diameter also situated in said conduit.

In testimony whereof I affix my signature in presence of two witnesses.

FRANKLIN ELIJAH SMITH.

Witnesses:
T. SELBY WARDLE,
THOS. F. HARGREAVES.